United States Patent
Lassiter

(10) Patent No.: US 6,624,846 B1
(45) Date of Patent: *Sep. 23, 2003

(54) VISUAL USER INTERFACE FOR USE IN CONTROLLING THE INTERACTION OF A DEVICE WITH A SPATIAL REGION

(75) Inventor: Charles L. Lassiter, Palo Alto, CA (US)

(73) Assignee: Interval Research Corporation, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/896,928

(22) Filed: Jul. 18, 1997

(51) Int. Cl.$^7$ ................................. H04N 5/232
(52) U.S. Cl. .................. 348/211.4; 348/39; 348/211.8
(58) Field of Search ................. 348/218, 211, 348/15, 36, 37, 38, 39, 552, 727, 33, 211.9, 211.4, 211.7, 211.8, 14.05, 218.1; 352/69; 358/450; 345/349, 434, 327, 328

(56) References Cited

U.S. PATENT DOCUMENTS

| | | | |
|---|---|---|---|
| 4,527,201 A | | 7/1985 | Cappels ..................... 358/224 |
| 4,847,543 A | | 7/1989 | Fellinger .................... 318/628 |
| 5,182,641 A | * | 1/1993 | Diner et al. ................ 358/103 |
| 5,185,667 A | | 2/1993 | Zimmermann ............. 358/209 |
| 5,187,571 A | | 2/1993 | Braun et al. .................. 358/85 |
| 5,262,856 A | | 11/1993 | Lippman et al. ............ 358/136 |
| 5,396,287 A | * | 3/1995 | Cho .......................... 348/211 |
| 5,396,583 A | | 3/1995 | Chen et al. ................. 395/127 |
| 5,404,316 A | * | 4/1995 | Klingler et al. ............ 345/328 |
| 5,438,357 A | * | 8/1995 | McNelley .................... 348/15 |
| 5,444,478 A | | 8/1995 | Lelong et al. ................ 348/39 |
| 5,510,830 A | | 4/1996 | Ohia et al. ................... 348/36 |
| 5,539,483 A | | 7/1996 | Nalwa ......................... 353/94 |
| 5,583,565 A | * | 12/1996 | Cortjens ..................... 348/15 |
| 5,689,300 A | * | 11/1997 | Shibata et al. ........... 348/14.07 |
| 5,726,717 A | * | 3/1998 | Peters et al. ................ 348/593 |
| 5,754,230 A | * | 5/1998 | Tsuruta ...................... 348/333 |
| 5,793,367 A | * | 8/1998 | Taguchi ...................... 345/330 |
| 5,844,693 A | * | 12/1998 | Miyata ....................... 358/448 |
| 5,999,173 A | * | 12/1999 | Ubillos ....................... 345/328 |
| 6,061,055 A | * | 5/2000 | Marks ........................ 345/349 |

FOREIGN PATENT DOCUMENTS

| | | | | |
|---|---|---|---|---|
| EP | 0513601 | | 11/1992 | |
| EP | 0700203 | | 3/1996 | |
| EP | 0713331 | | 5/1996 | |
| EP | 0737005 | | 10/1996 | |
| JP | EP 0700203 | * | 3/1996 | ......... H04N/5/232 |
| JP | EP 0713331 A | * | 5/1996 | ......... H04N/5/232 |
| US | EP 0513601 | * | 11/1992 | ......... G08B/13/196 |

* cited by examiner

Primary Examiner—Wendy R. Garber
Assistant Examiner—Jacqueline Wilson
(74) Attorney, Agent, or Firm—Van Pelt & Yi LLP

(57) ABSTRACT

An improved visual user interface enables control of the interaction of a device with a spatial region. The visual user interface includes a display of a control space and a display of a target space. The content of the displayed target space can be a representation of some or all of the spatial region. The content of the displayed control space and displayed target space can also be established such that the displayed target space provides context for the displayed control space. The device is operated in accordance with the state of the displayed control space. The visual user interface enables a user to change the display of the control space, thereby controlling the operation of the device. Such a visual user interface in which a target scene provides context for a control scene can, for example, facilitate perception by a video camera operator of a current filmed scene in the context of the current filmed scene's surroundings, thereby enhancing the camera operator's ability to engage in critical and sophisticated camera work with great precision. The visual user interface can also include a space for making annotations regarding the interaction of the device with the spatial region, thereby enabling such annotations to easily be made contemporaneously with control of the device, so that a single person can perform both functions well. Additionally, the annotation capability can be implemented in a way that enables the user to handwrite the annotations, thus facilitating a wide range of expression in creating annotations and avoiding the problems associated with voice annotation systems.

6 Claims, 11 Drawing Sheets

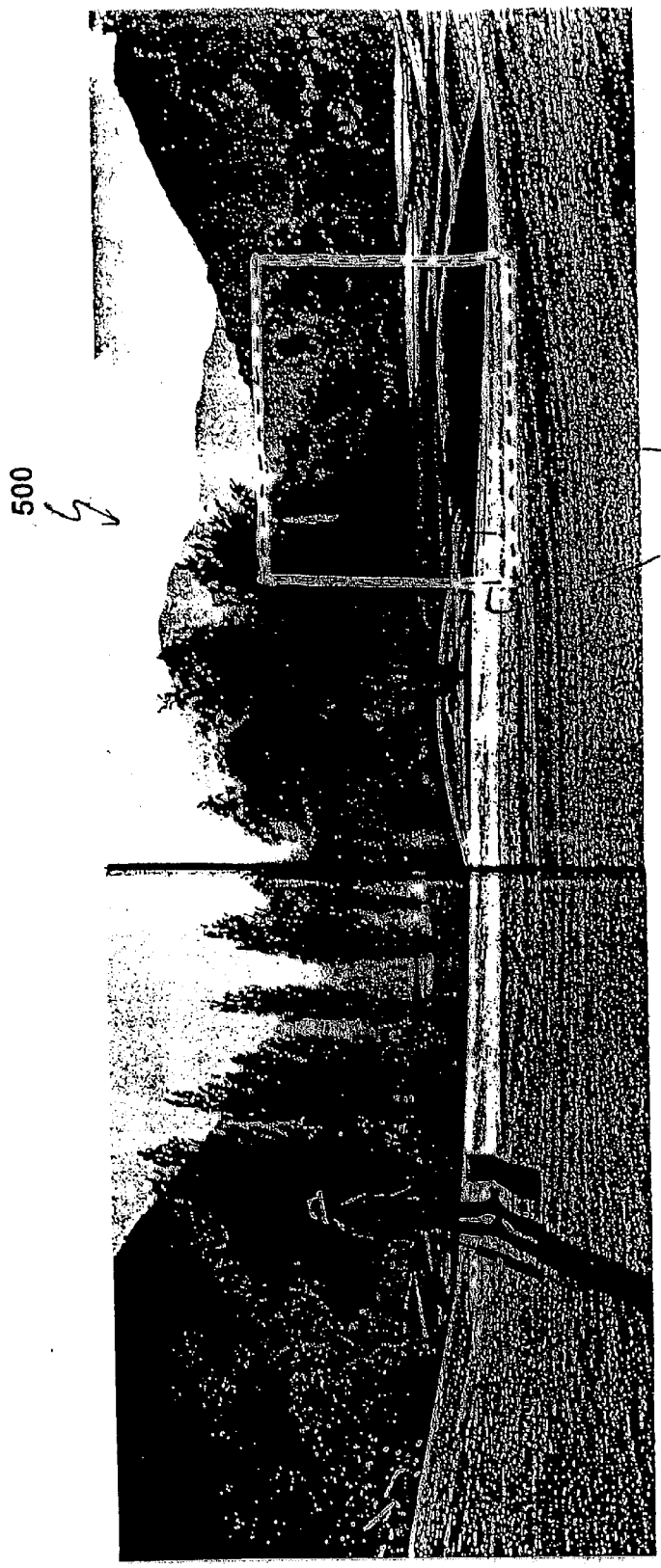
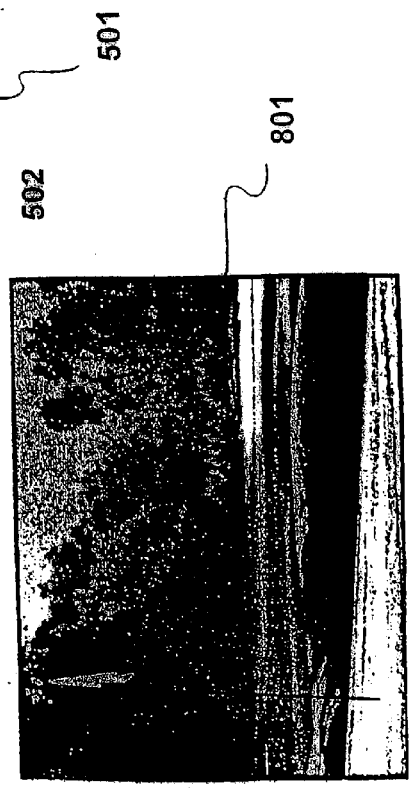
FIG. 8A
FIG. 8B

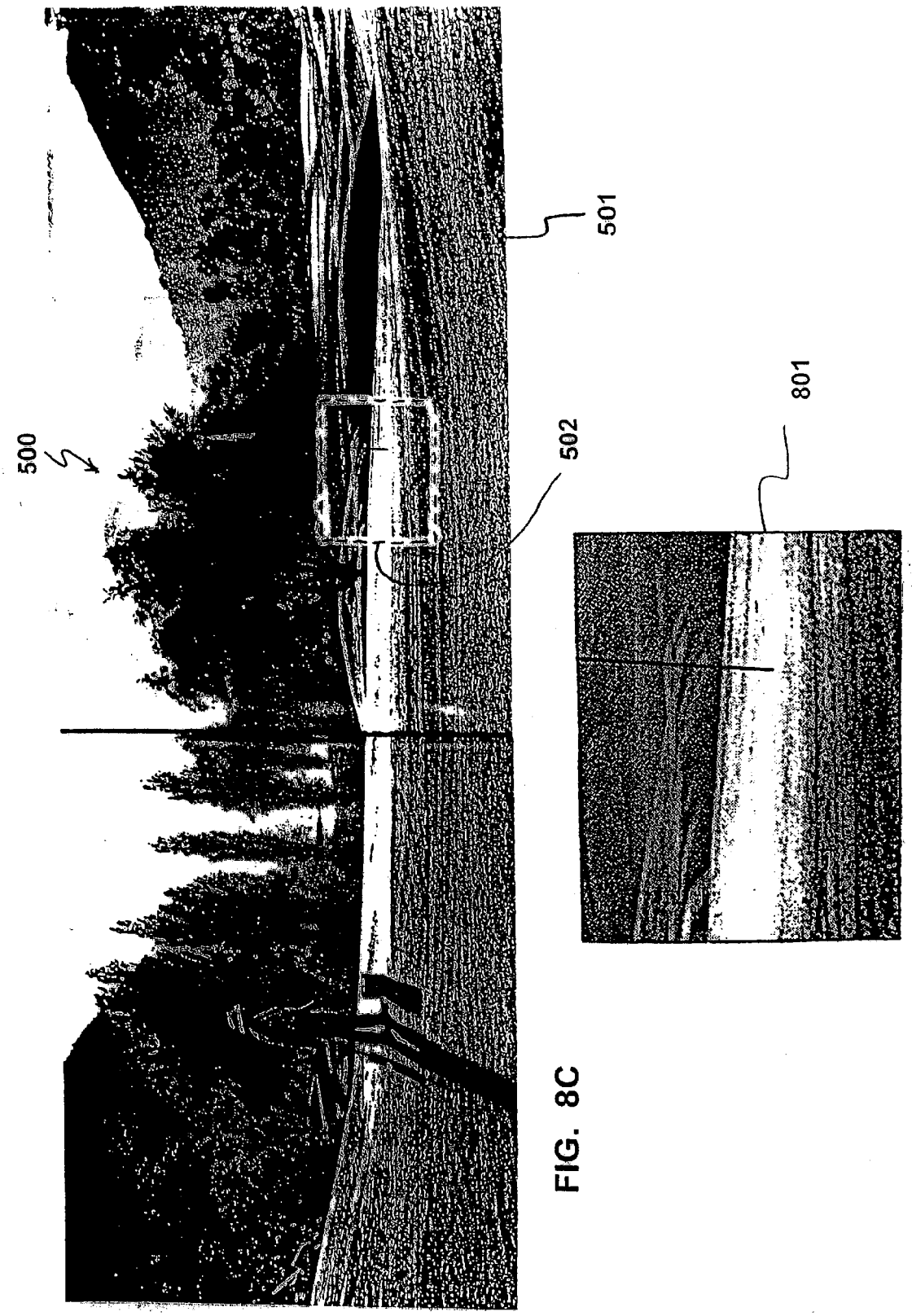

VISUAL USER INTERFACE FOR USE IN CONTROLLING THE INTERACTION OF A DEVICE WITH A SPATIAL REGION

BACKGROUND OF THE INVENTION

1. Field of the Invention

This invention relates to a visual user interface for use in controlling the interaction of a device with a spatial region, such as the acquisition or display by a video device of a sequence of filmed scenes that are each part of a panoramic scene.

2. Related Art

A conventional video camera typically includes a viewfinder, the view through which corresponds generally to a portion (the filmed scene) of a scene that is being filmed. During conventional operation of such a video camera, the camera operator looks through the viewfinder while filming so that camera operator knows what is being filmed and so that the camera operator can control the camera to film a desired sequence of filmed scenes. However, during such operation, the camera operator's view is limited to what can be seen through the viewfinder. Since the camera operator cannot view portions of a scene adjacent to the filmed scene, the camera operator is deprived of context for the filmed scene. This limitation impairs the camera operator's ability to operate the camera so as to film a scene in a desired way (i.e. to acquire a desired sequence of filmed scenes). It has historically been part of the art of a skilled camera operator to be able to remember the content of a scene having a scope larger than can be encompassed within the field of view of the viewfinder of the video camera, so that the camera operator can seamlessly control the camera to change the filmed scene in a desired manner.

A video camera can he hand-held. A video camera can also be mounted on a camera support device that typically provides multiple degrees of freedom of movement of the camera. The above limitation in operation of a conventional video camera applies to both hand-held and mounted camera operation in which the camera operator controls the content of the filmed scene by looking through the viewfinder. While the camera operator can periodically look away from the viewfinder to observe the larger context of the scene being filmed, such operation is undesirable for a variety of reasons. For example, the camera operator may inadvertently misdirect the camera while not looking through the viewfinder. It is also difficult for the camera operator to readjust image perception and focus each time the operator looks away from the viewfinder to the larger scene, and vice versa. Additionally, the inability to view a current filmed scene simultaneously with the surrounding context of the current filmed scene makes it difficult for the camera operator to plan movement of the camera to film other scenes adjacent to the current filmed scene.

Mounted cameras can also be operated remotely. A video display at a remote site is connected to the video camera so that a current filmed scene is displayed by the remote video display. A control device is connected to, for example, one or more motors (or other driving devices) which are, in turn, coupled to the camera support so as to move the camera support in response to signals received from the control device. The camera operator observes the remote video display and operates the control device to control the sequence of filmed scenes acquired by the video camera. Aside from the obvious benefits (e.g., the capability of filming in areas that are hazardous to humans), remote video camera operation allows the camera operator to move away from the viewfinder so that the entire area surrounding a current filmed scene can be more easily observed during filming. However, the camera operator still cannot simultaneously view the surrounding area and the current filmed scene, so that such remote camera operation still suffers from the above-described deficiencies to an undesirable degree.

The above-described operation of a video camera is "manual" operation, i.e., the camera operator must either directly or indirectly provide control of the camera at each instant in time. Automatic control of a video camera has also previously been implemented. At a predetermined location, a video camera is mounted on a camera support that allows a variety of camera motions. The video camera is connected to a control device as described above. Metrics are established for the camera support so that positions of the camera support can be correlated with particular filming directions of the video camera. During operation of the video camera, the control device, in accordance with a pre-specified instructions, transmits control signals to the motors to cause the camera support to be moved in a fashion that produces a desired sequence of filmed scenes. Using such automatic control, the position, velocity and acceleration of the video camera can be controlled at each instant in time. Automatic control of a video camera can enable dynamic control of the camera that may not be reproducible by a human operator with the same precision or speed. Automatic control can also enable pre-scripting of a sequence of filmed scenes. However, automatic control still does not satisfactorily address the above-described problems, since it does not allow real-time camera control in a manner that facilitates perception by the camera operator of the filmed scene in the context of the filmed scene's surroundings. Filming a live event, such as a sporting event, is just one example of a situation in which such automatic camera control is inappropriate.

Once a videotape (or other set of video data) has been produced by filming a sequence of video scenes, it is desirable to have an indication of the content of the videotape and, further, an indication of where (i.e., when) particular content occurs within the videotape. A convenient way to create a record of the content of a videotape is to produce a set of time-identified annotations during filming of the videotape. However, many videotaping systems do not include a capability to produce such annotations. Creation of a handwritten set of annotations by the camera operator using, for example, paper and pencil can unduly interfere with the actual filming, thus necessitating the presence of a second person to make the annotations. Some videotaping systems include a user interface that enables selection of one of a set of predetermined textual annotations. However, such systems can be inadequate because they necessarily enable only a limited range of description of the content of the videotape. Further, these systems, while typically more convenient than using paper and pencil, may also require the presence of a second person to perform the annotation so that the camera operator is not inordinately distracted from filming. Some videotaping systems enable voice annotation to be made during filming of a videotape. However, voice annotation is inappropriate for situations in which speaking during filming of the videotape may disrupt the event or scene being filmed. Further, searching a set of audio data (here, the set of spoken annotations) for desired content can be difficult, therefore making it difficult to review a set of annotations to find a particular description of the videotape content.

SUMMARY OF THE INVENTION

In accordance with one aspect of the invention, control of the interaction of a device with a spatial region is enabled using an improved visual user interface. The visual user interface includes a display of a control space and a display of a target space. The target space typically has a specified relationship to the spatial region and, often, is a representation of some or all of the spatial region. The content of the control space and target space can also be (and often is) established such that the target space provides context for the control space. The device is operated (i.e., interacts with the spatial region) in accordance with the state of the display of the control space. For example, the device can be operated in accordance with the spatial relationship between the control space and the target space. The visual user interface according to this aspect of the invention enables a user to change the state of the display of the control space, thereby controlling the operation of the device. Generally, the display of the control space can be changed in any manner that is possible for the application with which the visual user interface is being used.

For example, a visual user interface according to this aspect of the invention can display a target scene and a control scene. Such a visual user interface can be used, for example, to control a video device. The video device controlled can be of any type, including video devices that acquire video data (e.g., video cameras, video-enabled motion picture cameras) and video devices that display video data (e.g., televisions, computer display monitors, and video or graphics projection systems). A user can, for example, cause the control scene to change in size, shape, angular orientation and/or location with respect to the target scene, which can cause, for example, a filmed scene to change in a corresponding way. Other aspects of the control scene, such as visual parameters (e.g., focus, tint, brightness), can also be changed.

A visual user interface according to this aspect of the invention can overcome, for example, the above-identified deficiencies in previous video camera operation that are associated with the limited field of view of a video camera or instance, a visual user interface according to the invention in which the target scene provides context for the control scene can facilitate perception by a video camera operator of a current filmed scene in the context of the current filmed scene's surroundings. A camera operator's ability to engage in critical and sophisticated camera work with great precision is greatly facilitated. The visual user interface according to this aspect of the invention can enable such difficult camera work to be performed by relatively unskilled camera operators who heretofore would not have been able to perform such camera work acceptably.

In accordance with another aspect of the invention, a visual user interface embodied in a single device enables control of the interaction of a device with a spatial region and the capability to make annotations regarding the interaction of the device with the spatial region. The visual user interface according to this aspect of the invention enables such annotations to easily be made contemporaneously with control of the device, so that a single person can perform both functions well. Additionally, the visual user interface can be implemented in a way (e.g., with a touchscreen and stylus) that enables the user to handwrite the annotations, thus facilitating a wide range of expression in creating annotations. Such a visual user interface also avoids the problems associated with voice annotation systems, e.g., disruption of the event or scene being filmed, and difficulty in searching through the annotations.

The invention can be used in a wide variety of applications. In particular, the invention is useful in applications which require the control of a video device. Examples of such applications with which the invention can be used include movie and television film production and display, security camera systems and video conferencing systems. The invention can be used, however, in applications other than those in which a video device is controlled. For example, the invention could be used in controlling a lighting device or devices so that a spatial region is illuminated in a desired way.

BRIEF DESCRIPTION OF THE DRAWINGS

FIGS. 8A and 8B illustrate a visual user interface in accordance with an embodiment of the invention in which the current filmed scene is displayed in addition to the control scene and the target scene.

DETAILED DESCRIPTION OF THE INVENTION

Stated generally, a visual user interface according to one aspect of the invention can enable control of the interaction of a device with a spatial region. (Herein, such "interaction" can also include the display of an interaction of a device with a spatial region.) The visual user interface includes a display of a control space and a target space. Typically, the target space has a specified relationship to the spatial region, e.g., the target space can represent some or all of the spatial region. The control space and target space can be displayed together so that at least a portion of the control space overlaps at least a portion of the target space, the content of the overlapping portions of the control space and target space being substantially the same, such that the target space provides context for the overlapping portion of the control space. The device is controlled in response to the state of the display of the control space. For example, the spatial relationship between the control space and the target space can be determined and used to control the device in a particular manner. The visual user interface enables a user to change the state of the display of the control space, thereby effecting control of the device and its interaction with the spatial region.

A visual user interface in accordance with this aspect of the invention can be used, for example, to control a video device. Herein, "video device" encompasses any device for acquiring video data and/or generating a display from video data (e.g., a video camera, a video-enabled motion picture camera, a television, a computer display monitor, and a video or graphics projection system). Hereafter, often, the invention is described in detail with respect to embodiments of the invention that can be used with video devices. It is understood, however, that the invention has broader applicability and can be used with other types of devices, some of which are also discussed below.

Figure 1:
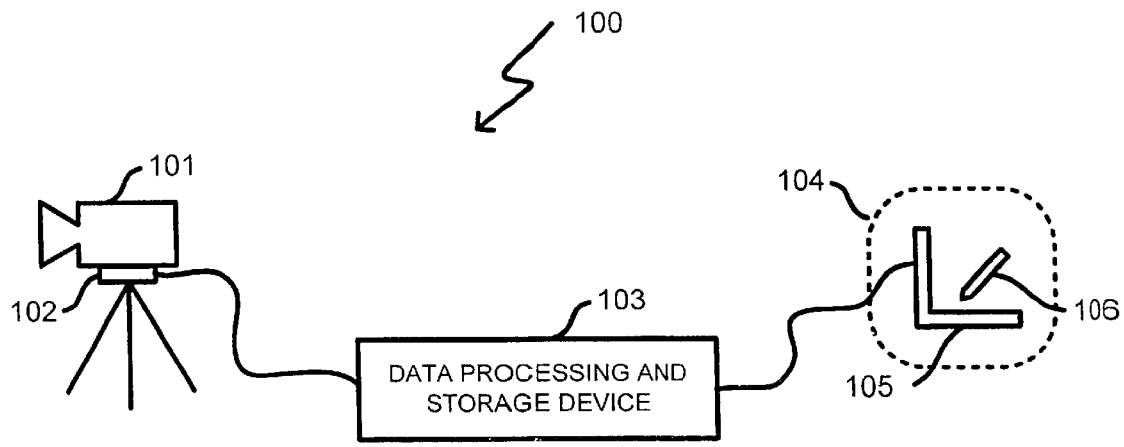
FIG. 1 is a simplified representation of a system with accordance with the invention.

FIG. 1 is a simplified representation of a system 100 with which the invention can be used. A video camera 101 is mounted on a movable camera mount of a tripod 102 (or other camera support device). The movable camera mount can be embodied by any such mount (of which a number of known types exist) that enables desired movement (rotational, translational or both) of the video camera 101. Often, movable camera mounts are implemented to enable one or more of three types of rotational movement of a video camera: panning (i.e., rotation about a panning axis that changes the filming direction of a video camera in a right or left direction relative to a "normal" orientation of the video camera), tilting (i.e., rotation about a tilt axis that changes the filming direction of a video camera in an up or down direction relative to a "normal" orientation of the video camera) and rotating (i.e., rotation about a rotational axis that leaves the filming direction of a video camera unchanged or substantially unchanged and, instead, causes rotation of a filmed scene). Advantageously, the movable camera mount can enable movement of the video camera 101 having three rotational degrees of freedom (i.e., rotation about the pan, tilt and rotational axes), and the invention is often described below with respect to embodiments that enable such movement. However, the invention can also be used with systems in which the video camera movement has only one or two rotational degrees of freedom. The invention can also be used with systems that enable translational motion (one, two or three degrees of freedom) of the video camera in addition to, or instead of, rotational movement. (For example, a particularly robust system according to the invention could be implemented to allow video camera motion having three rotational degrees of freedom and three translational degrees of freedom.) As explained in more detail below, metrics are established for the movable camera mount that correlate positions of the movable camera mount with filming directions, orientations and/or positions of the video camera 101. (A filming direction can be specified in any appropriate manner, such as, for example, by specifying the content at the location of the center of the area being filmed by the video camera.)

A user interface device 104, which can be any appropriate device that can display a visual user interface according to the invention, is used by a user to input instructions for use in controlling operation of the video camera 101. The user interface device 104 can be embodied by, for example, a conventional portable computing device, such as a notebook computer, subnotebook computer, personal digital assistant (PDA) or other similar device, together with, as appropriate, one or more associated user input devices, such as, for example, a mouse, keyboard, trackball or stylus. Embodying the user interface device 104 in a portable device is advantageous because it enables the user interface device 104 to be easily moved to filming locations together with the video camera 101 and tripod 102. As illustrated in FIG. 1, the user interface device 104 includes a portable computing device 105, as well as a stylus 106 that can be used to contact a touchscreen (which can be used to display the visual user interface according to the invention) of the portable computing device 105 to effect input of instructions from the user to the portable computing device 105. However, the user interface 104 can be implemented by other devices, including computing devices that are not portable, such as, for example, a desktop or workstation computer.

A data processing and storage device 103 is interconnected with the user interface device 104, the tripod 102 (in particular, a position encoder or encoders of the movable camera mount) and the video camera 101 to enable communication therebetween. Such communication can be implemented using any appropriate methods and apparatus (e.g., serial or parallel digital communications apparatus and protocols, such as the RS232/C protocol and associated apparatus), as known to those skilled in the art. Moreover, such communication can be either wired or wireless, thus enabling the data processing and storage device 103 and the user interface device 104 to be implemented either as tethered (wired) or untethered (wireless) devices. A system in which the data processing and storage device 103 and the user interface device 104 are untethered can be advantageous because it affords greater freedom of movement for a user during use of those devices (and, in particular, during use of a visual user interface according to the invention).

The data processing and storage device 103 can, for example, store video data acquired by the video camera 101 and data describing the video camera metrics discussed above, as well as any other data and/or instructions (e.g., audio data and instructions for use of audio data) that are used in the operation of the system 100. The device 103 can also process instructions and data received from the video camera 101, the position encoder or encoders of the movable camera mount of the tripod 102 and user interface device 104, as well as transmit instructions and data to those devices. For example, when an instruction regarding the filming direction, position and/or orientation of the video camera 101 is received from the user interface device 104, the device 103 uses the metric information stored therein to determine the appropriate position of the movable camera mount and send an instruction to cause the movable camera mount to move to that position. Or, for example, the device 103 can receive video data representing filmed scenes acquired by the video camera 101, process and/or store the video data as necessary or desirable, and communicate data and instructions to the user interface device 104 to cause generation of a display of a visual user interface according to the invention, as described elsewhere herein. The device 103 can also store data representing the camera metrics for each filmed scene acquired by the video camera 101.

The device 103 can be implemented, for example, by a conventional digital computer. In particular, the device 103 can advantageously be embodied in a portable computing device (examples of which are given above with respect to the description of the user interface device 104). As with the user interface device 104, embodying the data processing and storage device 103 in a portable device is advantageous because it enables the data processing and storage device 103 to be easily moved with the video camera 101 and tripod 102 to filming locations. However, like the user interface device 104, the data processing and storage device 103 can be embodied by devices that are not portable, such as, for example, a desktop or workstation computer.

The data processing and storage device 103 and the user interface device 104 can advantageously be embodied in the same device, thus reducing the number of separate pieces of apparatus necessary to implement the system 100.

Figure 2:
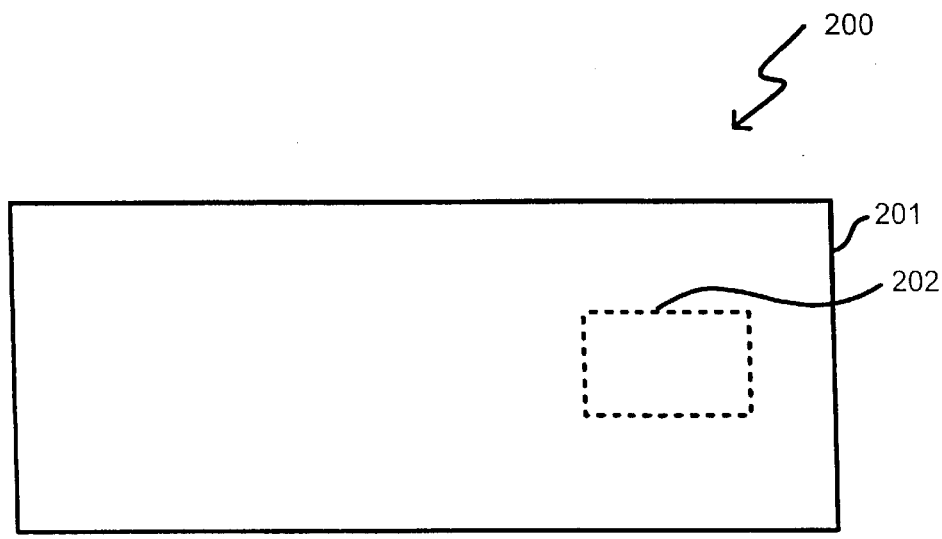
FIG. 2 illustrates a visual user interface, in accordance with one embodiment of an aspect of the invention in which a visual user interface is used to control the interaction of a device with a spatial region, that is used to control the operation of a video device.

FIG. 2 illustrates a visual user interface 200, in accordance with one embodiment of this aspect of the invention, that is used to control the operation of a video device, such as the video camera 101 of FIG. 1. (The visual user interface 200 can also be used in controlling other types of devices, as discussed further elsewhere herein.) The visual user interface 200 includes a display of a target scene 201 and a display of a control scene 202. As illustrated in FIG. 2, the control scene 202 is a defined region within the target scene 201. The content of the control scene 202 is the same or substantially the same as the content of the target scene 201 that would otherwise be present at the location of the control scene 202, such that the content of the target scene 201 provides context for the control scene 202. (This can be better appreciated in the illustration of a visual user interface according to the invention shown in FIGS. 5A through 5C, described below.) The boundaries of the control scene 202 can be delineated in any appropriate graphical manner as known by those skilled in the art of implementing video displays.

A filmed scene is acquired or displayed by the video device in accordance with the state of the display of the control scene 202. As described in more detail below, the user can change the display of the control scene 202 to cause changes in the filmed scene. For example, if the visual user interface 200 is implemented in the user interface device 104 (FIG. 1), changing the position of the control scene 202 within the target scene 201 can cause an instruction to be sent to the position encoder or encoders of the movable camera mount of the tripod 102 to cause an appropriate change in the filming direction and/or position of the video camera 101.

Herein, a "filmed scene" is a scene that is being, has been, or can be acquired or displayed by a video device. As used herein, filmed scene typically refers to a representation (e.g., a frame of video data) of a part of a spatial region (which can be the entire spatial region), though the term can also be used to refer to the part of the spatial region itself. A "control scene" is a displayed scene that is displayed as part of a visual user interface according to the invention and can be changed by a user to effect control of a device. (Similarly, a "control space" is a displayed space that is displayed as part of a visual user interface according to the invention and can be changed by a user to effect control of a device.) When the device is a video device, changing the control scene causes a change in the filmed scene. In such an embodiment, often, the content of the control scene is the same (or substantially the same) as the content of a current filmed scene, though, as described below, this need not necessarily be the case. A "target scene" is a displayed scene that is displayed as part of a visual user interface according to the invention and provides context for a control scene and/or is related to a control scene to effect particular operation of the device being controlled. (Similarly, a "target space" is a displayed space that is displayed as part of a visual user interface according to the invention and provides context for a control space and/or is related to a control space to effect particular operation of the device being controlled.) The target scene typically has a specified relationship to the spatial region with which the controlled device interacts, and, often, is a representation of some or all of the spatial region. Thus, when the controlled device is a video device, typically, the content of a filmed scene is at least partially (and, often, entirely) drawn from the target scene. Often, a target scene represents a "panoramic scene," which, as used herein, refers to a scene that can entirely encompass a filmed scene. In practice, a panoramic scene may be much larger than a filmed scene. For example, the target scene may represent a panoramic scene which encompasses the entire field of view of a camera operator, or a panoramic scene which encompasses a 360 degree field of view from a specified location. When the target scene represents a panoramic scene, the target scene can be a "composite scene," which is a scene that is constructed from a combination of multiple filmed scenes. Below, particular aspects of the invention are described with respect to an implementation of the invention in which the target scene is a composite scene that represents a panoramic scene, and the control scene is the same (or nearly the same) as a current filmed scene (see, for example, FIGS. 5A through 5B).

Figure 3:
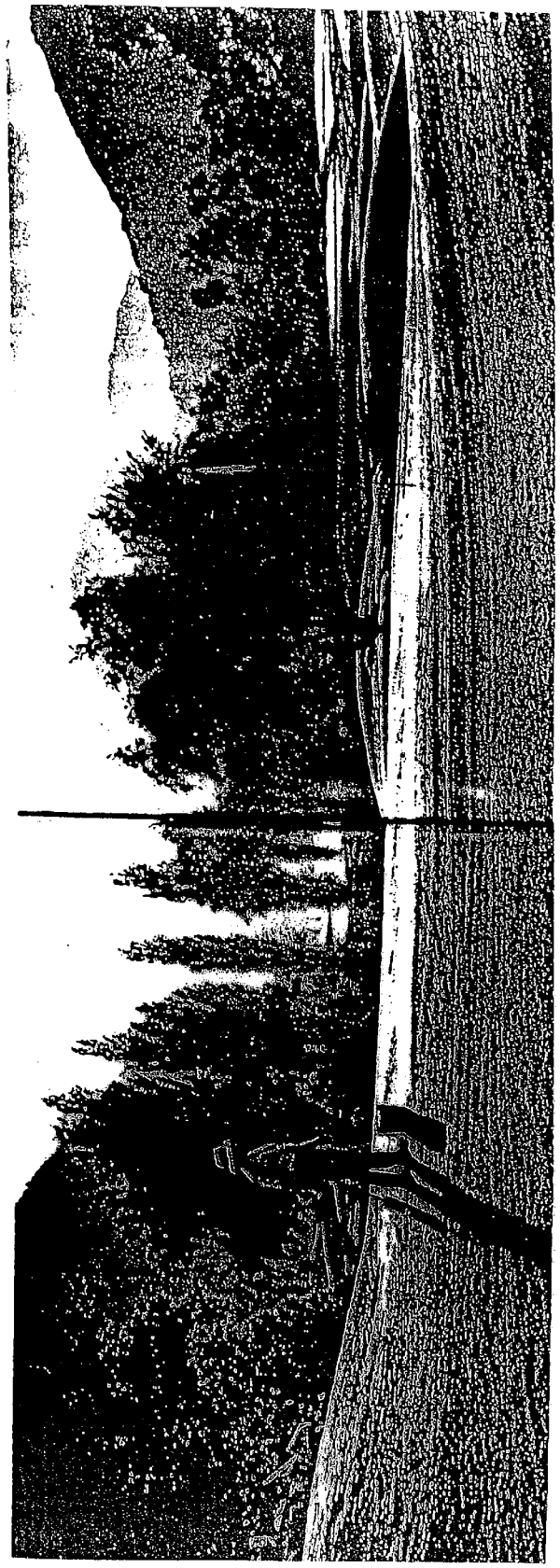
FIG. 3 is a panoramic scene within which a sequence of scenes is to be filmed or displayed.

FIG. 3 is a panoramic scene within which a sequence of scenes ("filmed scenes," in accordance with the above definitions) can be filmed or displayed. To illustrate the advantages of the visual user interface according to the aspect of the invention now being described, it will be assumed that a camera operator wishes to film the panoramic scene of FIG. 3 by beginning filming near the upper left corner of the panoramic scene, then sweeping downward to the center of the panoramic scene, and finishing by sweeping upward to the upper right corner of the panoramic scene. It is to be understood that the principles of the invention illustrated in the discussion below are also applicable to use of a visual user interface according to the invention to display a sequence of filmed scenes generated from a set of video data that represents the panoramic scene of FIG. 3.

Figure 4C:
FIGS. 4A through 4C illustrate successive filmed scenes from the panoramic scene of FIG. 3.
Figure 4B:
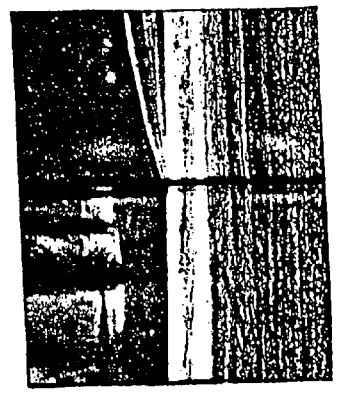
Figure 4A:

FIGS. 4A through 4C illustrate successive filmed scenes from the panoramic scene of FIG. 3 obtained during filming as described above. In previous manual control of a video camera, as described above, at any particular time the camera operator can look at either the filmed scene or the panoramic scene, but not at both simultaneously. Such video camera control is disadvantageous, as described in more detail above. For example, if the camera operator chooses to look at the filmed scene while filming, then, while the camera operator is filming the scene of FIG. 4A, for example, the camera operator sees only that scene. The camera operator must rely on his memory of the entire panoramic scene of FIG. 3 to know how to move the camera to get to the scene of FIG. 4B in a desired way (e.g., with a particular sweeping arc). Moreover, the camera operator must rely on such memory to recall the content of the scene of FIG. 4B itself, i.e., to know where he wants the camera to go. As can be appreciated, this can be a daunting task, particularly if the camera operator must film for an extended period of time without a break (i.e., without looking away from the filmed scene).

Figure 5A:
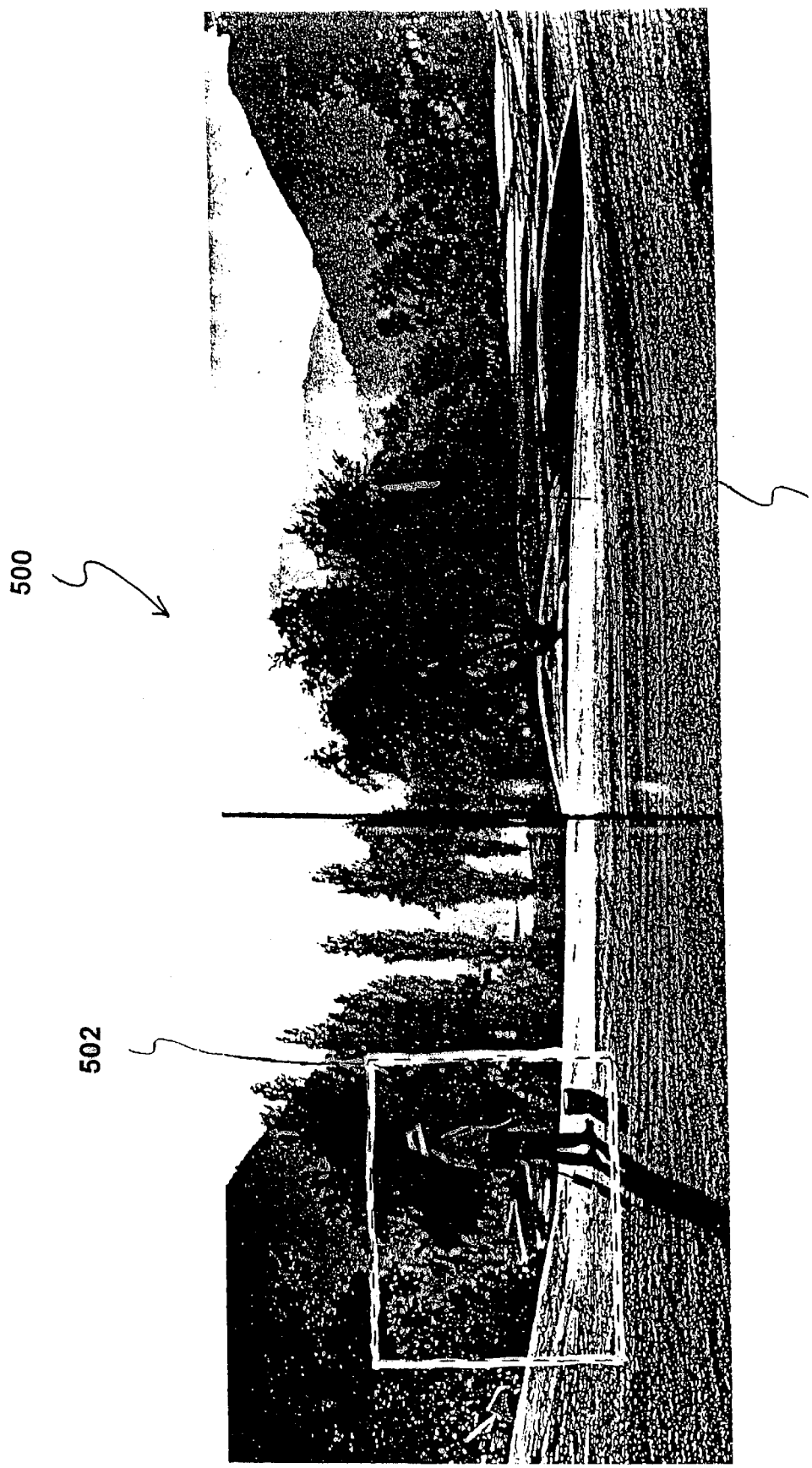
FIGS. 5A through 5C each illustrate a visual user interface in accordance with the invention at the time that the corresponding one of the scenes of FIGS. 4A through 4C is being filmed.
Figure 5B:
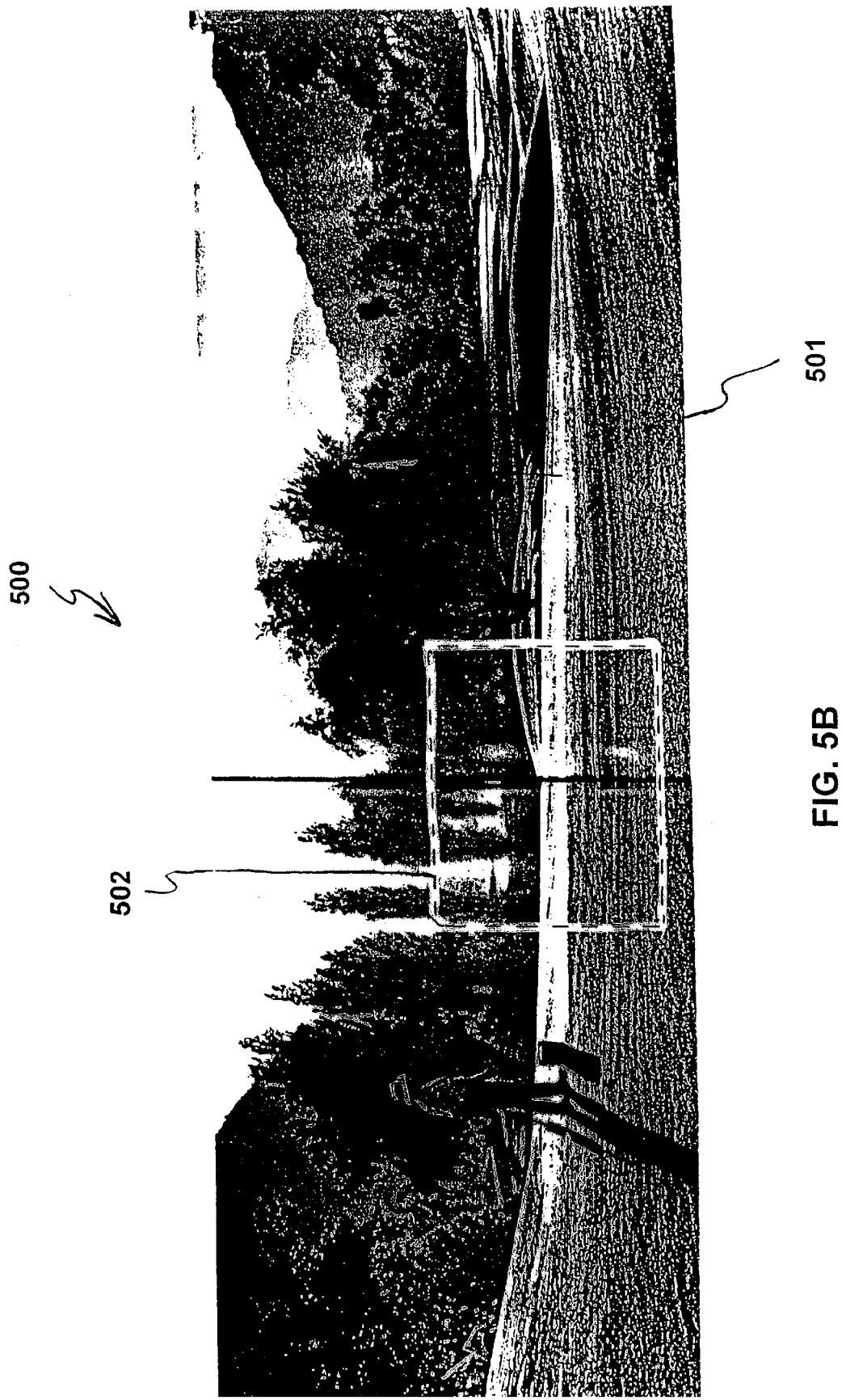
Figure 5C:
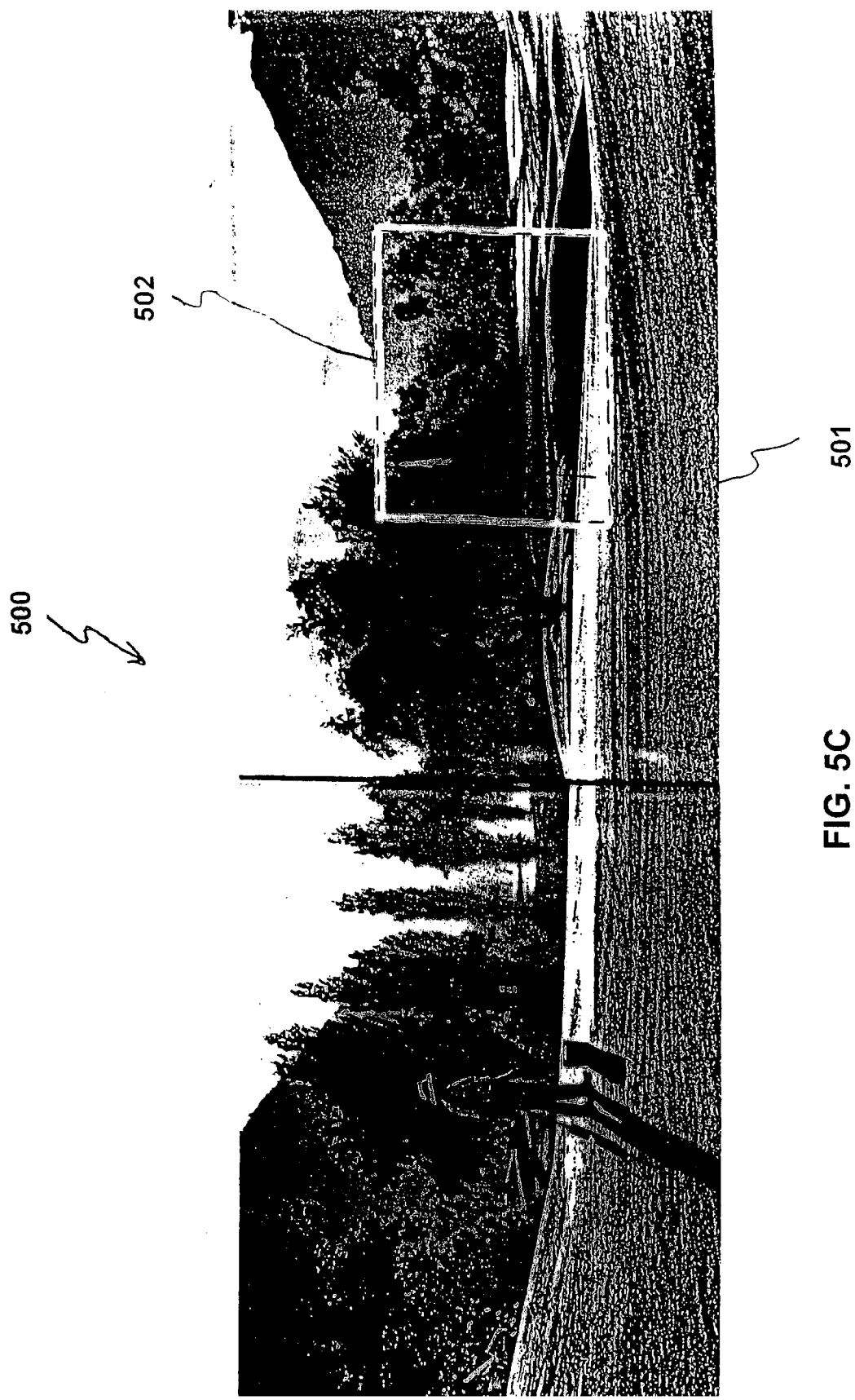

FIGS. 5A through 5C each illustrate a visual user interface 500 according to the invention at the time that the corresponding one of the filmed scenes of FIGS. 4A through 4C is being filmed. Like the visual user interface 200 of FIG. 2, the visual user interface 500 includes a display of a control scene 502 that is a defined region within a display of a target scene 501, such that the content of the target scene 501 provides context for the control scene 502.

As shown in FIGS. 5A through 5C, in the visual interface 500, the control scene 502 is the same as the filmed scene (examples of which are shown in FIGS. 4A through 4C) and the target scene 501 is the same as the panoramic scene (shown in FIG. 3). Thus, a user of the visual user interface 500 can directly (and viscerally) control the state of the filmed scene at any given time by controlling the display of the control scene 502. For example, as illustrated in FIGS. 5A through 5C, the control scene 502 (and, thus, the filmed scene) can be moved to various locations within the target scene 501. In accordance with the aspect of the invention now being described, then, during filming of the panoramic scene of FIG. 3 as described above, the camera operator would look at the visual user interface 500 illustrated in FIGS. 5A through 5C, rather than through the viewfinder of the camera (direct manual camera control) or at a display of the filmed scene (remote manual camera control), as is depicted in FIGS. 4A through 4C. The benefits of the visual user interface 500 are readily apparent. As the camera operator moves from filmed scene to filmed scene by changing the control scene 502, the current filmed scene (displayed as the control scene 502) can always be simultaneously viewed in context of the remainder of the panoramic scene (which is displayed as the target scene 501).

In addition to being used to control operation of a video camera, the visual user interface 500 could also be used to control the display of an existing set of video data that represents a panoramic scene. Again, the user would make changes in the control scene 502, such changes causing corresponding changes in the displayed filmed scene.

While, as indicated above and by the detailed description of the invention below, the invention is particularly useful as applied to control a video device, the invention is not limited to such applications. In general, a visual user interface according to the invention can be used to control the interaction of any type of device with a spatial region and can control the device in any manner or to perform any function, such as, for example, panning, tilting, rotating, zooming, focusing, aiming, shooting, firing, tracking, projecting, pointing, pasting and painting.

For example, a visual user interface according to the invention, such as the visual user interfaces 200 (FIG. 2) and 500 (FIGS. 5A through 5C), could also be used to control a lighting device or devices so that a spatial region is illuminated in a desired way. A user could, for example, position a control scene within a target scene to cause a spotlight to be directed to a particular location within a spatial region represented by the target scene. Making the control scene larger or smaller could, for instance, cause the emitted light to become focused on a correspondingly larger or smaller area. Changing the focus of the control scene might, for example, increase or decrease the collimation of the emitted light, while changing the brightness of the control scene could cause corresponding changes in the intensity of the emitted light. The above-described techniques for using a visual user interface according to the invention to control a lighting device are merely illustrative; they are neither necessary nor exhaustive.

In general, a control space displayed as part of a visual user interface according to the invention can be changed in any manner. For example, a user can cause a display of a control space (e.g., a control scene) to change spatially with respect to a display of a target space (e.g., a target scene), such change causing a predetermined change in the operation of a device (e.g., a filmed scene of a video device). As one illustration of such spatial changes, a user can cause the display of a control scene to change in size, shape, angular orientation and/or location with respect to the display of a target scene. As used to control operation of a video camera (or other video device), for example, such changing of the control scene can be manifested as, for example, panning, tilting, rotating and/or zooming. A user can also change the display of a control space in other ways. For example, a user can change visual parameters (such as focus, tint, contrast and/or brightness) of the display of a control scene. As used to control operation of a video camera or video enabled motion picture camera, for example, such changing of the control scene can be manifested as, for example, changes in the lens focusing mechanism, white balance, pedestal, and/or aperture and/or gain, respectively, of the camera.

A control space (e.g., control scene) can, in general, have any predetermined relationship to the device interaction with the spatial region (e.g., filmed scene). For example, in a visual user interface according to the invention that is used to control a video device, it is anticipated that it will often be advantageous to have a control scene that is the same (or substantially the same) as the filmed scene. However, this need not necessarily be the case. The control scene can be larger or smaller than the filmed scene. For example, it may be desirable to make the control scene proportionally larger or smaller than the filmed scene.

Further, in general, the interaction of the device with the spatial region (e.g., filmed scene) can change in response to changes in the display of the control space (e.g., control scene) in any predetermined manner. For example, in a visual user interface according to the invention that is used to control a video device, it is anticipated that it will often be advantageous for the filmed scene to change in the same manner as the control scene, e.g., if the control scene is changed in size, the filmed scene is changed in size in the same proportions (and, perhaps, by the same amount or amounts). However, again, this need not necessarily be the case.

As indicated above, in a visual user interface according to the invention that is used to control a video device, the filmed scene can advantageously be the same or substantially the same as the control scene (as in the visual user interface 500 described above), and can advantageously change in a manner that directly corresponds to changes in the control scene. Such a visual user interface is advantageous, for example, because it provides the user with a visceral sense of the control being effected.

Additionally, the target space (e.g., target scene) can, in general, have any predetermined relationship to the control space (e.g., control scene). For example, in a visual user interface according to the invention that is used to control a video device, it is anticipated that it will often be advantageous for the control scene to be encompassed (typically entirely, but at least partially) within the target scene. This is advantageous because it provides context to the user that can aid the user in changing the control scene in a manner that provides desired control of the filmed scene. Again, though, there need not necessarily be such a relationship between the control scene and target scene.

In general, both the display of the control space and the display of the target space can be either a static display or a dynamic display. It is anticipated that, in many applications of a visual user interface according to the invention, it will be advantageous to have a dynamic control space display. When a visual user interface according to the invention is used to control a video device, for example, this can usually be easily accomplished by making the control scene the same as the filmed scene, which, typically, will be dynamic. Additionally, in a visual user interface according to the invention that is used to control a video device, whether a static or dynamic target scene is used will typically involve a tradeoff between the cost of generating the display of the target scene (static is typically cheaper) and the quality of the display of the target scene (dynamic generally provides a more accurate display).

Above, a visual user interface, according to one aspect of the invention, that enables control of the interaction of a device with a spatial region has been described generally. Below, a detailed description is given of ways in which a visual user interface according to this aspect of the invention can be implemented. The description is generally made with respect to a visual user interface that is similar to the visual user interfaces 200 (FIG. 2) and 500 (FIGS. 5A through 5C), i.e., a visual user interface including i) a target scene that represents a panoramic scene, and ii) a control scene that is smaller than, and subsumed within, the target scene, and that is, when the visual user interface is used to control a video device, the same (or nearly the same) as a filmed scene.

To enable the spatial characteristics (e.g., location within the target scene, and angular orientation, size and shape relative to the target scene) of the control scene to be used to control operation of a video device, metrics must be recorded that relate particular content in the target scene to particular physical attributes of the device being controlled. For example, if the device being controlled is a video camera, then, for a particular camera location relative to the panoramic scene, the location of a region of content within the target scene (i.e., the filming direction) can be related to a mechanical position of the video camera (e.g., the angular orientation about the pan and tilt axes of a movable camera mount of a tripod-mounted video camera). Additionally, the angular orientation of a region of content can be related to a mechanical position of the video camera (e.g., the angular orientation about the rotational axis of a movable camera mount of a tripod-mounted video camera). Further, the size of a region of content can be related to the camera lens characteristics (e.g., the setting of a zoom lens). It may also be possible to relate the shape of a region of content to camera characteristics: for example, the aspect ratio of a rectangular region of content can be related to the aspect ratio of the imaging device of the video camera to appropriately subsample the filmed scene recorded by the camera. The determination of such video camera metrics can be accomplished using any appropriate method. For example, one such method is described in U.S. Pat. No. 4,847,543, the disclosure of which is incorporated by reference herein. As indicated above (see the description of FIG. 1), the video camera metrics (i.e., encoded positions of the video camera) can be stored in a data storage device and used to control a position encoder or encoders of a movable camera mount to appropriately position the video camera in response to spatial changes in a control scene made by a user of a visual user interface according to the invention.

If, instead, the video device being controlled is a video display device, then the location, angular orientation, size and shape of a region of content (i.e., the content of the control scene) within the target scene can be used to subsample video data that is used to generate the display of the target scene. In many cases, the video data used to generate the target scene will have previously been acquired and stored on an appropriate data storage device. However, it is also possible to subsample the target scene video data (in accordance with the control scene content) as it is being acquired to effect control of a displayed filmed scene. Methods for accomplishing such subsampling are described in, for example, U.S. Pat. Nos. 5,185,667 and 5,444,478, the disclosures of which are incorporated by reference herein.

Often, a target scene that represents a panoramic scene is a composite scene, i.e., a scene that is constructed from a combination of multiple filmed scenes. To form the composite scene, a panoramic scene that is to constitute the target scene can be scanned by a video camera that records filmed scenes (i.e., video "frames") at the frame rate of the video camera (e.g., 30 frames per second). (The filmed scenes could also be acquired by scanning the panoramic scene or defined parts of the panoramic scene with multiple video cameras.) The filmed scenes and/or parts of filmed scenes are then combined in some manner to produce the composite scene. The filmed scenes are often acquired as analog data and the method of combining filmed scenes operates on digital data, thus necessitating analog to digital conversion of the data. This can be accomplished, as known by those skilled in the art, using conventional methods and apparatus. The video camera or cameras used to acquire the filmed scenes from which the composite scene is to be created can be panned, tilted, rotated and zoomed to enable the full resolution of the camera or cameras to be used in a variable and cumulative manner, thereby enabling the composite scene to be constructed from multiple filmed scenes which each have up to the full resolution of the camera or cameras.

For example, the filmed scenes can be "stitched" together to form the composite scene. Each filmed scene represents a portion of the panoramic scene. The content of the filmed scenes can, and typically will, overlap. Stitching the filmed scenes together causes the content of the filmed scenes to be pieced together so that corresponding overlapping parts of filmed scenes are blended together to make the composite scene appear to be (relatively) seamless. Stitching together of multiple filmed scenes to form a composite scene can be accomplished using any appropriate method. Since methods that produce the highest quality composite scenes are usually the most computationally expensive, the particular method used may be chosen based on a tradeoff between computational cost and quality of the composite scene. Frame stitching methods that can be used with the invention are described in, for example, U.S. Pat. Nos. 5,396,583, 5,510,830 and 5,262,856, the disclosures of which are incorporated by reference herein.

A composite scene can be formed from multiple filmed scenes in any other appropriate manner, as well. For example, the video camera metrics can be used to locate each filmed scene within the panoramic scene. Filmed scenes can then be selected, based upon their location, and pieced together like a puzzle so that each selected filmed scene adjoins or overlaps other adjacent selected filmed scenes. However, the matching at the edges of the filmed scenes may not be exact, so that a composite scene formed in this way may not appear as seamless as a composite scene formed by stitching.

For many applications with which the invention can be used, it is preferable that the filmed scenes from which a composite target scene is constructed be acquired prior to use of the visual user interface to control a device, since, as indicated elsewhere herein, the target scene is often used to provide context for the control scene. This can be done, for example, by using a video camera in a conventional manner to film a panoramic scene. Or, it may be possible to use the control scene to operate a video camera to acquire filmed scenes from which a target scene can be constructed. In particular, this can be accomplished if the content of the control scene is the same as that of the filmed scene. The absence of the target scene is not greatly detrimental, since the user is only seeking to sweep the video camera over all of the content of the panoramic scene, rather than attempting to perform precision camera work.

However, it need not be the case that the filmed scenes from which a composite target scene is constructed are acquired prior to use of the visual user interface. If the visual user interface is being used to control a video camera, the composite scene can be constructed "on the fly" from filmed scenes as the visual user interface is used to control the video camera to acquire the filmed scenes.

Further, when a visual user interface according to the invention is used to control a video camera, in either an implementation in which the composite scene is constructed on the fly or an implementation in which the composite scene is constructed before use of the visual user interface, the content of the composite scene can be updated with newly acquired filmed scenes. Such updating can be done selectively to reduce the computational burden associated therewith. For example, only every nth filmed scene might be used to update the composite scene. Or, a record could be maintained of the time of the most recent update of each defined part of the composite scene, and only filmed scenes corresponding to "stale" parts of the composite scene (i.e., parts of the composite scene that have not been updated for greater than a predetermined duration of time) used to update the composite scene. Additionally or alternatively, "stale" parts of the composite scene can be indicated by a graphical effect which may also be implemented so as to indicate the relative "staleness" of the particular part of the composite scene (i.e., the magnitude of the duration of time that the part of the composite scene has not been updated). For example, the color of a "stale" part of the composite scene can be gradually faded to black and white over time, the boldness of the color of that part of the composite scene indicating its relative "staleness."

In a visual user interface such as the visual user interfaces 200 (FIG. 2) and 500 (FIGS. 5A through 5C), the display of the target scene must be continually adjusted as the display of the control scene is moved to different locations within the target scene. The boundary of the control scene can be changed using conventional GUI methods, as discussed further below. The location of the boundary of the control scene within the target scene at any time can be determined from those methods. Appropriate video data can then be selected from the stored video data representing the entire composite target scene so that a display of the target scene is generated in all of the area of the visual user interface that is allotted for the display of the target scene and that is not being used by the display of the control scene.

The control scene in a visual user interface according to the invention need not always be confined to the boundaries of the target scene. However, since the use of a target scene to provide context for a control scene is particularly advantageous, it may be desirable, where the target scene is related to the control scene so as to provide such context, to at least confine movement of the control scene relative to the target scene so that the control scene is always at least partly surrounded by the target scene. There are two possible scenarios that can be addressed. In one, the display of the target scene is implemented so that the area of view encompassed by the target scene remains constant. In such an implementation, limitation of movement of the control scene as described above can be readily accomplished by those skilled in the art of implementing video displays. In the second scenario, the display of the target scene is implemented so that the area of view encompassed by the target scene can move. This scenario may be useful in situations where it is desired to display a target scene that encompasses only part of a panoramic view to be filmed (perhaps because it is felt that the size of the target scene is sufficiently small that displaying the entire panoramic scene as the target scene will cause features in the target scene to be too small to be easily discerned). In this case, the visual user interface could be implemented so that when the control scene reaches a predefined location near a boundary of the target scene (referred to hereafter as "a predefined distance from a boundary of the target scene," though it is possible to implement this embodiment of the invention so that part of the control scene may already be extending outside of the boundary of the target scene at this point), the area of view of the target scene moves as necessary to maintain that predefined distance from the boundary of the target scene. The above may be useful to better match the control scene and target scene sizes and resolutions to the display type used.

Figure 6A:
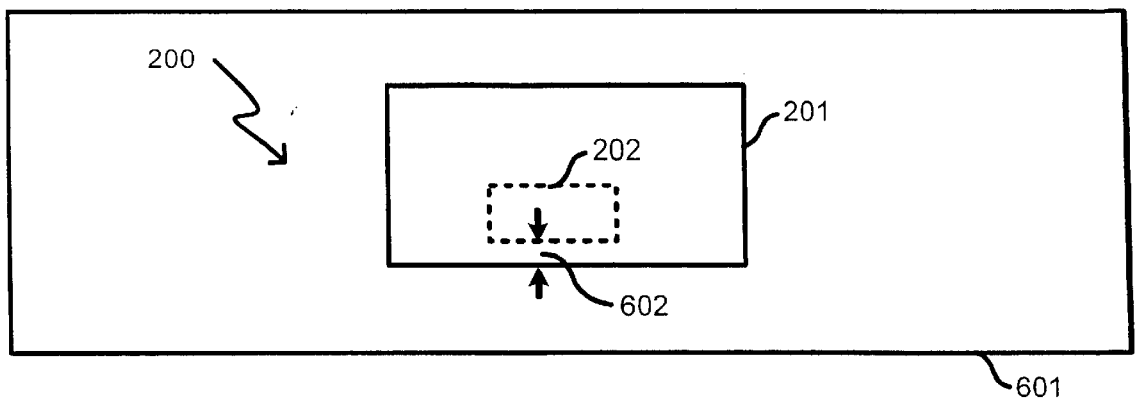
FIGS. 6A through 6C illustrate the operation of the visual user interface of FIG. 2 in accordance with an embodiment of the invention in which the area of view of the target scene can move as necessary to keep the control scene at least partly surrounded by the target scene.
Figure 6B:
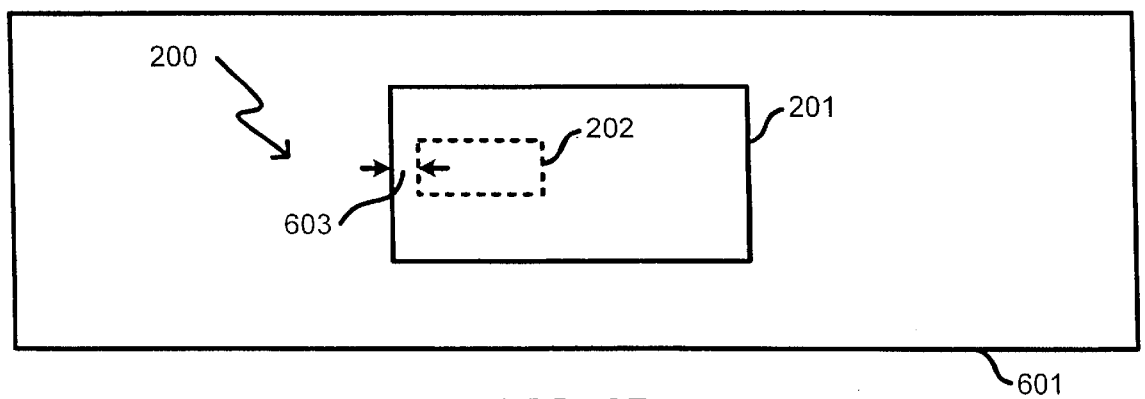
Figure 6C:
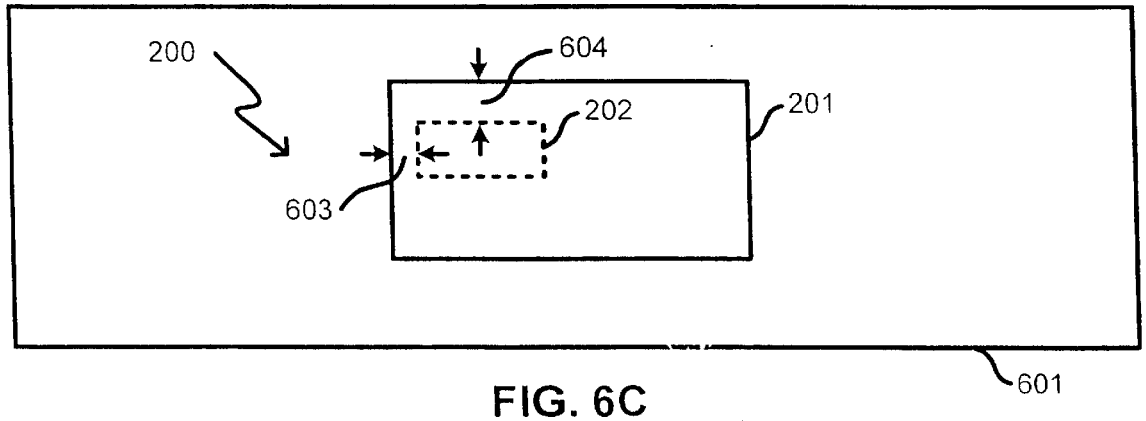

FIGS. 6A through 6C illustrate operation of the visual user interface 200 (FIG. 2) in accordance with an embodiment of the invention in which the area of view of the target scene 201 can move as necessary to keep the control scene 202 at least partly surrounded by the target scene 201. In FIGS. 6A through 6C, for aid in illustrating this embodiment of the invention, a panoramic scene 601 is shown superimposed over the visual user interface 200. As can be seen, the target scene 201 can include only part of the panoramic scene 601 at any one time. In FIG. 6A, the target scene 201 includes content near the center of the panoramic scene 601, and the control scene 202 is positioned within the target scene 201 near the bottom of the target scene 202. It is assumed that the visual user interface 200 is implemented to allow no portion of the control scene 201 to come closer than a predetermined minimum distance from the boundary of the target scene 201, and that the distance 602 is greater than this minimum distance. In FIG. 6B, the control scene 202 has been moved up and to the left with respect to the target scene 201 so that the left boundary of the control scene 202 is a distance 603 from the left boundary of the target scene 201. The distance 603 is assumed to be equal to the minimum distance; therefore, the content of the target scene 201 is the same as in FIG. 6A. In FIG. 6C, the control scene has been moved even further up and to the left with respect to the target scene 201. In order to maintain the minimum distance between the boundary of the control scene 202 and the boundary of the target scene 201, the target scene 201 moves to the left—in coordination with the movement of the control scene 202—with respect to the panoramic scene (in the visual user interface 200, this would actually appear as the panoramic scene 601 moving to the right in the target scene 201). The distance between the left boundaries of the control scene 202 and target scene 201 is still 603. Further, the distance 604 between the upper boundaries of the control scene 202 and target scene 201 is greater than the minimum distance (i.e., greater than the distance 603); thus, the target scene 201 does not move with respect to the panoramic scene 601 in that direction.

Detection of the distance between the boundaries of the control scene 202 and target scene 201 can be accomplished using conventional GUI techniques. The content of the target scene 201 can be modified by appropriately stitching additional filmed scenes to a previously existing target scene 201 in the same manner as described elsewhere herein for creating a composite target scene.

As indicated above, both the display of a target scene and the display of a control scene of a visual user interface according to the invention can be either dynamic or static. For many applications (e.g., videotaping with a video camera), it is desirable that the display of the control scene be dynamic, since the content of the control scene corresponds exactly or very nearly to the content of the current filmed scene, and it is necessary or desirable to have as accurate a depiction of the control scene as possible to ensure that the control scene will be controlled to obtain or produce the desired sequence of filmed scenes. In applications in which the control scene duplicates the current filmed scene, the control scene can be generated directly from the filmed scene (e.g., from a display feed from a video camera) using conventional methods and apparatus.

In some situations, it may be acceptable to have a static control scene display. When the target scene display is also static, the content of a static control scene display can easily be generated as the content that would otherwise be present at that location within the target scene. When the display of the control scene is static, the control scene can be demarcated in any appropriate manner, such as by, for example, displaying an outline of the area of the control scene or by making the area of the control scene more or less bright than the area of the target scene. The use of a static control scene display may be desirable because the generation of a static scene can typically be accomplished more easily and inexpensively than the generation of a dynamic scene. While a visual user interface including a static control scene display can be used for any application, such a visual user interface may be advantageously used, in particular, to control a lighting device, as described above, since the loss of fidelity associated with the static control scene display would typically not be detrimental in effecting accurate control of a lighting device.

The display of the target scene can also be either dynamic or static, the choice usually depending, as described above, on the evaluation of a tradeoff between the quality of the target scene display and the cost of generating that display. A static target scene display can be formed as a composite scene as described above, e.g., using a frame stitching method as described above to create a composite scene from multiple filmed scenes.

A dynamic target scene display can be constructed from the sequences of filmed scenes acquired by multiple video cameras that each shoot a fixed region of space within a panoramic scene at the same time, the regions adjoining and/or overlapping each other. The operation of the multiple video cameras is synchronized, as known by those skilled in the art, so that frames of video data are acquired at the same time (or substantially the same time) by each of the video cameras. Such synchronization can be accomplished in any appropriate manner, such as supplying the cameras with a genlock reference signal and "free running" the SMPTE time code, as known by those skilled in the art. Filmed scenes (i.e., frames of video data) acquired at the same time from the multiple video cameras can be combined to form a dynamic composite scene. Once such a set of temporally coincident filmed scenes has been determined, the filmed scenes from the set can be combined to form a composite target scene by, for example, stitching together adjacent and/or overlapping filmed scenes in a manner similar to that described above for creating a static composite target scene. Frame stitching methods that can be used with the invention to create a dynamic composite scene are described in, for example, U.S. Pat. Nos. 5,444,478 and 5,187,571, the disclosures of which are incorporated by reference herein. Alternatively, a dynamic composite target scene can be created by using the video camera metrics to locate each sequence of filmed scenes within the panoramic scene, and piecing together the sequences of filmed scenes, based upon their locations, so that the sequences of filmed scenes adjoin or overlap adjacent sequences of filmed scenes, in a manner similar to that described above for creating a static composite target scene.

In some applications of the invention, such as filming of movies or television shows, the visual user interface can be used to control a relatively expensive, high quality video camera. The use of multiple such cameras to acquire filmed scenes for use in constructing a dynamic composite target scene would, in many cases, be undesirably expensive. Thus, when it is desired that the target scene display be dynamic, the cost of producing such a dynamic target scene display can be reduced by using cheaper video cameras (e.g., single-CCD cameras) to acquire the filmed scenes used to construct the composite target scene. An expensive camera can be used to acquire the filmed scenes (and, if the interface is so configured, the control scene) that are actually to comprise the desired video display. For example, the expensive camera can be mounted on a movable camera mount of a tripod and controlled by a position encoder or encoders as described above, and the inexpensive cameras can be mounted at other locations on the tripod and positioned (i.e., aimed in particular directions) so that the filmed scenes obtained by the inexpensive cameras can be combined to produce the composite scene. Preferably, the nodal points about which the inexpensive cameras are positioned are as close to coincident as possible. Though the target scene display will be of lesser quality than the control scene display, this will often not be an important detriment. The fact that the target scene display is dynamic rather than static is advantageous in and of itself.

It may also be possible to use a single relatively inexpensive camera (e.g., one single-CCD camera) including a very wide angle lens (e.g., a "fish-eye" lens) to acquire scenes having sufficient resolution to be used as a target scene. To produce an acceptable target scene display, it would typically be desirable to perform distortion correction, as known to those skilled in the art, on the filmed scenes (video data) acquired by such camera. The use of a camera as described above to acquire filmed scenes, including application of distortion correction to the filmed scenes, is described in, for example, the above-mentioned U.S. Pat. No. 5,185,667.

Any appropriate apparatus and methods can be used to enable a user to make changes in a control scene. For example, a user can be enabled to make spatial changes in a control scene (e.g., changes in the size, shape, angular orientation and/or location of the control scene) by, for example, using an appropriate input device (e.g., a mouse, keyboard, trackball, stylus, joystick or Trackpoint™ mechanism) to appropriately change the boundary of the control scene in accordance with the requirements of conventional graphical user interface (GUI) software and hardware that implements such functionality (e.g., the hardware and software used to implement such functionality in GUI-based operating systems such as the Windows™ operating systems). If, for example, the visual user interface is displayed on a touchscreen, the above-described changing of the size, shape, angular orientation and/or location of the control scene can be accomplished using a stylus or, perhaps, the user's finger. Other apparatus can also be used to make spatial changes in a control scene. For example, a conventional rocker switch can be used, as can be readily understood by those skilled in the art, to effect zoom control of a control scene, as well as control of the location of the control scene. Or, for example, a conventional rotating knob can be used, as can also be readily understood by those skilled in the art, to effect rotation of a control scene. Conventional pushbuttons can also be used to effect desired changes in the size, shape, angular orientation and/or location of the control scene. Many other types of apparatus can also be used to effect appropriate control of a control scene (including control of visual parameters of the control scene, as discussed elsewhere herein), as can readily be appreciated. For example, a voice recognition system can be used to enable a user to speak commands (e.g., "Zoom", Pan Left", etc.) to effect control of a control scene.

Figure 7A:
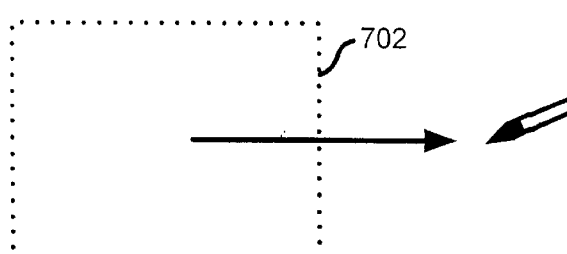
FIGS. 7A through 7E illustrate the use of a stylus and touchscreen to make spatial changes in a control scene that effect corresponding spatial changes in a filmed scene.
Figure 7B:
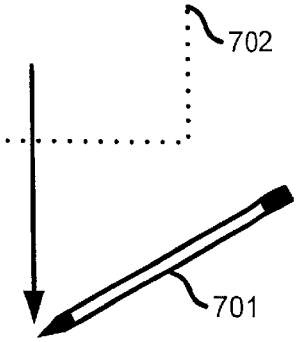
Figure 7B:
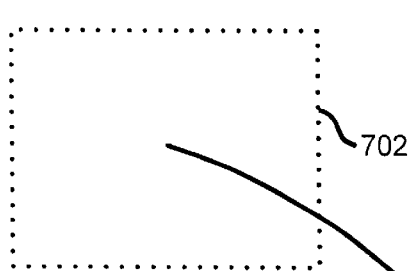
Figure 7C:
Figure 7C:
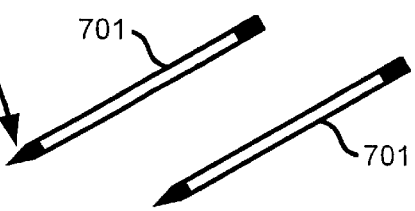
Figure 7E:
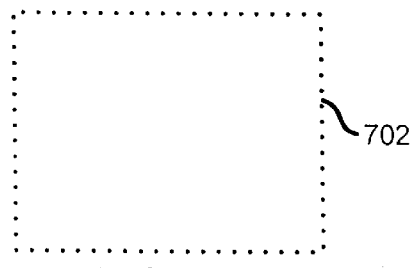
Figure 7D:
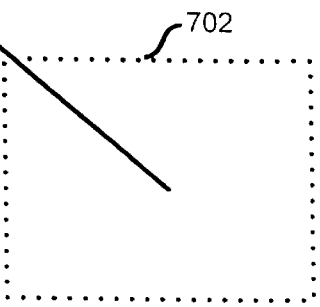
Figure 7F:
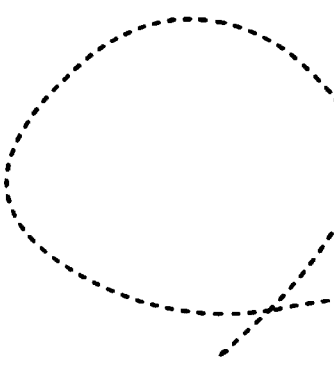

FIGS. 7A through 7E illustrate the use of a stylus and touchscreen to make changes in the location of a control scene display that effect corresponding spatial changes in a filmed scene. In FIG. 7A, the stylus 701 is positioned within the control scene 702 and dragged across the touchscreen to the right, causing the filmed scene to pan to the right. In FIG. 7B, the stylus 701 is positioned within the control scene 702 and dragged across the touchscreen in a downward direction, causing the filmed scene to tilt downward. In FIG. 7C, the stylus 701 is positioned within the control scene 702, dragged across the touchscreen to the right, then, transitioning gradually in a smooth arc, dragged across the touchscreen downward, causing the filmed scene to begin panning to the right, then, transitioning gradually in accordance with the arc made by the stylus 701, end by tilting downward. In FIG. 7D, the stylus 701 is positioned within the control scene 702 and dragged across the touchscreen upward and to the left, causing the filmed scene to pan to the left and tilt upward at the same time. In FIG. 7E, the stylus 701 is used to draw a circle on the touchscreen outside of the control scene 702, thus causing the control scene 702 to move from the location shown in FIG. 7E to a location defined by the circle (this can be implemented using a bounding box or "lasso" GUI tool, such as is implemented in the Adobe Photoshop™ software) and thereby causing the filmed scene to move in a similar manner. (The same type of control could be effected by touching the stylus at a point on the touchscreen outside of the control scene 702.) As can be appreciated, many other similar types of stylus moves can be used to move the control scene 702 and thereby control the filmed scene. Further, as can be appreciated, when a display screen that is not a touchscreen is used to display the visual user interface, such control moves could also be effected using, for example, a mouse (or device having similar functionality, such as a trackball) to control the position of a pointer on the display screen.

Though not illustrated in the drawings, the stylus 701 could also be used to change the size of the control scene 702. (Other apparatus may be used for this purpose as well, such as one or more rocker switches or pushbuttons, as discussed above.) For example, conventional GUI techniques (such as are used in, for example, the Windows™ operating systems) could be implemented so that, when the stylus 701 is placed on the outline of the control scene 702, then dragged across the touchscreen, the outline of the control scene 702 moves with the stylus, thus changing the size of the control scene 702. For example, moving the stylus 701 toward or away from the content of the control scene 702 could cause the control scene 702 to become smaller or larger, respectively, which could, in turn, cause the filmed scene to become smaller or larger, respectively (i.e., the stylus 701 is used to change the control scene 702 to effect zooming). The control scene 702 can be made as small as desired, subject only to the limitation that the control scene 702 must remain large enough to enable control by the interface device used to change the control scene 702 and/or to the constraints imposed by a device (e.g., the lens of a video camera) being controlled. Similarly, the control scene 702 can be made as large as desired, subject only to the limitation imposed by the display screen on which the visual user interface is displayed and/or, again, to the constraints imposed by the video device.

Changes other than spatial changes (e.g., changes in visual parameters such as focus, tint and/or brightness) can also be made in a control scene (which, in turn, effects corresponding control of the video device) using GUI techniques. For example, the ability to control visual parameters such as focus, tint and/or brightness could be implemented using GUI slider bars that permit continuous adjustment between two extreme values. Tint and brightness changes can also be implemented using conventional mechanical or electronic controls that are usually already part of a display device. A display device for use in displaying a visual user interface according to the invention could also be modified to include a mechanical or electronic control for adjusting the focus of the control scene. A variety of other types of physical apparatus, including, for example, rocker switches, pushbuttons and knobs can also be used to effect control of visual parameters of a control scene. In general, any appropriate control mechanism can be used, as can be appreciated by those skilled in the art.

In some situations, it may be desirable to modify the user control in a predetermined manner. For example, when the user moves the location of a control scene, such movement may be more shaky or jerky than desired. Conversely, it may be desirable—to create a desired visual ambiance, for example—to make a movement of a control scene from one location to another more jerky than was the actual movement by the user. In accordance with a further aspect of the invention, user movement of the control scene (and, thus, movement of the filmed scene) can be modified according to a predetermined method. Such modification can be accomplished using known filtering techniques. For example, the jerkiness of movement of a control scene from one location to another can be increased or decreased using the Dynadraw technique developed by Paul Haeberli of Silicon Graphics, Incorporated, described, for example, at the World Wide Web address www.sgi.com/grafica/dyna/index.html (as of Jan. 27, 1997) and included as part of the SGI Developers Toolbox CD issued in 1997.

In a similar vein, when a movement of a control scene is not controlled directly by the user (e.g., when the user marks a location or area outside of a control scene to cause the control scene to move to a new location), a desired control scene movement can be produced in accordance with a predetermined method. The creation of a control scene movement from scratch is, typically, simpler than modification of a user movement, and can be readily accomplished by those skilled in the art using an appropriate mathematical model of the characteristics of the desired physical movement.

The specification of the predetermined method for modifying or creating a movement of a control scene can be accomplished in any appropriate manner. For example, the user could select a method from a menu of choices, the menu being made available to the user using any of a variety of well-known techniques.

A single visual user interface according to the invention could also be used to control multiple devices, e.g., control the operation of multiple video cameras. Assuming that the orientation of each video camera with respect to the scene to be filmed is known, each camera orientation could be related to the orientation of a target scene of the visual user interface with respect to the scene to be filmed. Then, as a control scene is changed within the target scene, each of the video cameras is controlled as appropriate to film the region corresponding to the control scene. Alternatively, changes in the operation of the video cameras can be referenced to one of the video cameras, and that video camera controlled directly using the visual user interface. The visual user interface could also be implemented to include a display of the filmed scene from each of the video cameras, as well as a mechanism to enable specification of the video camera from which a filmed scene is to be acquired at any given time. Such multiple video camera control can be particularly useful, for example, in filming a live event such as a sports event.

FIGS. 8A and 8B illustrate the visual user interface 500 (FIGS. 5A through 5C), modified to include a display of a current filmed scene 801 in addition to the displays of the control scene 502 and target scene 501. As indicated above, the content of the control scene 502 can be the same as the content of the current filmed scene 801. If desired (and as illustrated in FIGS. 8A and 8B), the display of the current filmed scene 801 can be implemented so that the current filmed scene 801 cannot be changed (e.g., moved, rotated, or made larger or smaller) by a user. (The current filmed scene 801 need not necessarily be implemented in such fashion, however.) Thus, no matter how a user changes the control scene 502, the current filmed scene 801 provides the user a display of the content that is currently being filmed or displayed which remains constant in size, resolution, angular orientation and location within the visual user interface 500. This can be appreciated by comparing FIG. 8A to FIG. 8B. In FIG. 8B, the control scene 502 has been made smaller and shifted slightly down and to the left as compared to FIG. 8A. Provision of a stable display of the current filmed scene 801 can be useful, for example, when the user makes the control scene 502 so small within the target scene 501 that it is difficult to discern the content of the control scene 502 (and, thus, the filmed scene), when the user has rotated the control scene 502 a great deal, or when the user is moving or rotating the control scene 502 rapidly.

Figure 9:
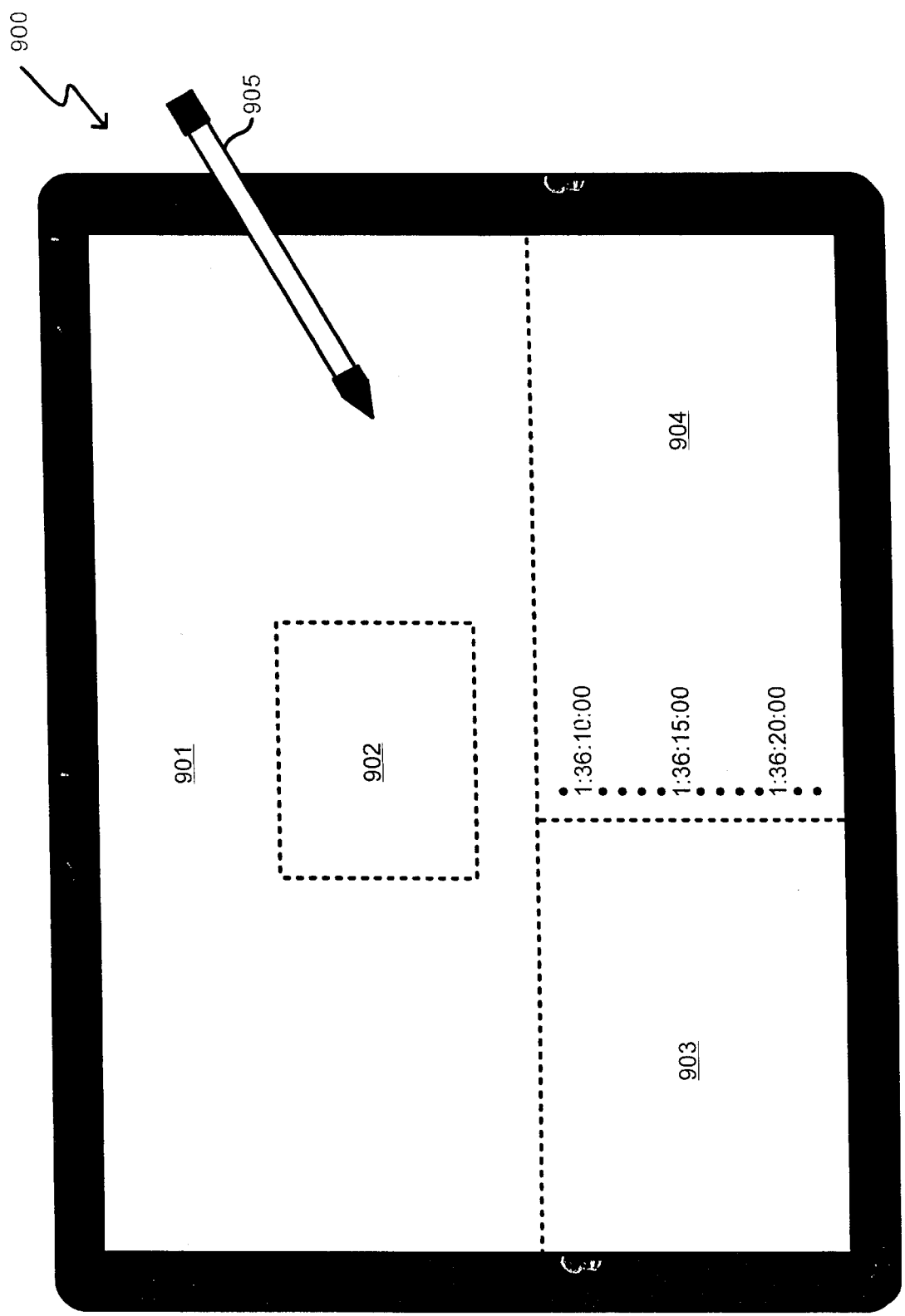
FIG. 9 illustrates a visual user interface in accordance with another aspect of the invention in which a visual user interface includes a space in which a user can make annotations regarding the device interaction with the spatial region.

FIG. 9 illustrates a visual user interface 900 in accordance with another aspect of the invention in which a visual user interface includes a space in which a user can make annotations regarding the device interaction with the spatial region (e.g., when the device is a video device, annotations regarding a filmed scene or scenes). For convenience in illustrating the principles of this aspect of the invention, the following description will be made with regard to an embodiment of the invention in which the visual user interface 900 is adapted for use in controlling a video device.

Similar to the visual user interface 500 as depicted in FIGS. 8A and 8B, the visual user interface 900 includes displays of a target scene 901, a control scene 902 and a current filmed scene 903. Each of the scenes 901, 902 and 903 is displayed and operates as described above. (In particular, the scenes 901, 902 and 903 enable a user to control the operation of the video device.) In addition to the scenes 901, 902 and 903, the visual user interface 900 includes an annotation space 904.

The annotation space 904 enables a user to make textual notations as the filmed scenes are being filmed or displayed by the video device. The user can, of course, make any desired textual notations. One advantageous use of the annotation space 904 is to make textual notations regarding the content of a filmed scene or scenes as those scenes occur.

As illustrated in FIG. 9, a time scale is automatically displayed at the lefthand side of the annotation space 904. The presence of the time scale in the annotation space 904 facilitates identification of the time at which annotations are made. The display of the time scale can be implemented so that the time scale appears to scroll through the annotation space 904 as time passes during filming or display. The display of the time scale can also be implemented so that the times in the time scale correspond to time codes (e.g., the well-known SMPTE time codes) associated with particular video data (e.g., a particular video frame or frames). Time-identified annotations (even when the time associated with the annotation only approximately identifies the time to which the annotation corresponds) are extremely useful to, for example, enable someone not familiar with a videotape to identify the content of the videotape, and, further, the location of particular content within the videotape. The time scale illustrated in FIG. 9 displays the number of—moving from left to right in FIG. 9—hours, minutes, seconds and frames (within a second) that have passed since the beginning of a use of the visual user interface 900 (which, in a typical use of the visual user interface 900, will correspond to the time that has passed since the beginning of a videotape). Other time scales can be used. Though useful, a time scale need not necessarily be present in the annotation space 904; the user could also note the time of an annotation as part of the annotation.

The annotation space 904 can be implemented using any appropriate apparatus and methods. For example, if the visual user interface 900 is displayed on a touchscreen, a stylus or the user's finger can be used to write notes in the annotation space 904. Such an embodiment of the invention is illustrated in FIG. 9, which shows a stylus 905 that can be used both to make notes in the annotation space 904 and to change the control scene 902. The touchscreen enables ascertainment of the patterns written in the annotation space 904. Software embodying handwriting recognition methods can then be used to interpret the patterns as words, numbers and symbols. Touchscreens and handwriting recognition software that have previously been developed and used in computational devices such as, for example, personal digital assistants (PDAs) can be used to implement an annotation space in a visual user interface according to the invention.

The annotation space 904 can also be implemented by enabling the user to use a conventional keyboard to type notes into the annotation space 904. Other ways of implementing the annotation space 904 are possible, as can be appreciated by those skilled in the art. However the annotation space 904 is implemented, it is, in general, preferable to enable interaction with the control scene 902 and the annotation space 904 via the same input device, so that the user can easily switch back and forth between the two.

The presence of an annotation space as part of the same user interface that enables control of a video device enables a single person to easily both operate the video device and make notes regarding the content of a sequence of filmed scenes acquired or displayed by the video device. A user of the interface can quickly move back and forth between controlling the video device via the control scene 902 and making notes in the annotation space 904, thus enabling annotations to be made contemporaneously with control of the video device. Moreover, when the device control portion of the interface is implemented in accordance with the aspect of the invention described above with respect to FIGS. 1 through 8B, the ease with which that portion of the interface enables device control contributes to the ease with which the complete interface can be used for contemporaneous device control and annotation, because the user is left with more time and attention to devote to making annotations. In contrast, previous ways of annotating a sequence of filmed scenes as they are acquired either necessitated two people (one to operate the video camera and the other to take notes), or unduly interfered with the operation of the video camera.

Additionally, the use of a touchscreen, stylus and handwriting recognition software in a user interface for enabling annotations of a sequence of filmed scenes provides wide latitude in expression, thus avoiding a limitation of previous systems that enable selection of an annotation from a predetermined set of "canned" annotations. Such a user interface also avoids the problems associated with voice annotation systems, e.g., disruption of the event or scene being filmed, and difficulty in searching through the annotations. (However, a visual user interface according to the invention can, if desired, be implemented with a voice annotation system.)

A visual user interface according to the invention can also be used to play back a sequence of filmed scenes that has previously been acquired using the visual user interface. Recorded camera metric information that correlates positions of the movable camera mount with filming directions, orientations and/or positions of the video camera during acquisition of filmed scenes can be used during playback to locate and scale the filmed scene properly with respect to a displayed target scene, so that, for example, the sequence of filmed scenes can be viewed in the context of a target scene that represents a panoramic scene within which the filmed scenes were acquired. As can be appreciated, use of the visual user interface according to the invention during playback provides a much enhanced viewing experience as compared to that obtained using conventional camcorders or television monitors.

Additionally, a visual user interface according to the invention can be used for editing or selective playback of the previously acquired filmed scenes. In general, the content of the control scene can be controlled in any manner as described above to identify particular content from the sequence of filmed scenes to either display or store. For example, a stylus and touchscreen can be used as described above with respect to FIGS. 7A through 7E to position the control scene at one or more locations, an appropriate user interface mechanism (e.g., any of a variety of appropriate graphical user interface mechanisms, such as GUI pushbuttons or pulldown menus) being used to specify that filmed scenes having content that is partly or entirely subsumed within the area defined by the specified control scenes be stored or displayed. The stylus and touchscreen can also be used to specify, rather than locations, particular types of movements (e.g., pans, tilts, zooms) of the control scene, the user interface mechanism being used to indicate that sequences of filmed scenes corresponding to such movements be stored or displayed. The control scene can also be controlled to specify any desired combination of control scene locations and/or movements to specify filmed scenes to be displayed or stored.

A visual user interface according to the invention can also be integrated with a video device that can be automatically controlled without user intervention (e.g., a video camera, such as the Sony EVI-D30 video camera). An appropriate user interface can be used to enable a user to, if desired, specify that the video device operate in accordance with a predetermined method for automatically controlling the video device (e.g., motion-tracking or color-tracking methods). For example, when a visual user interface according to the invention is used to control the operation of a video camera, such integration of automatic video camera control with the visual user interface can be useful to enable a camera operator to specify automatic operation of the camera during a period in which the user desires to make extensive annotations regarding the scenes being filmed.

Various embodiments of the invention have been described. The descriptions are intended to be illustrative, not limitative. Thus, it will be apparent to one skilled in the art that certain modifications may be made to the invention as described above without departing from the scope of the claims set out below.

I claim:

1. A visual user interface for use in controlling the interaction of a device with a spatial region, comprising:

means for displaying a target space and a control space, wherein an overlapping portion of the control space is within the target space, the content of the overlapping portion of the control space being substantially the same as the content of the target space that would otherwise be present at the location of the overlapping portion of the control space, such that the content of the target space provides context for at least the overlapping portion of the control space; and means for enabling a user to change the state of the display of the control space, wherein the device is controlled in response to the state of the display of the control space;

wherein the target space comprises a moving video image of a target area defined by the boundaries within which the device is capable of interacting with the spatial region and the overlapping portion of the control space comprises a moving video image of the portion of the target space with which the device is interacting at any given time;

wherein the target space comprises an area too large to be displayed at one time by the visual user interface and wherein the means for displaying is configured to display a portion of the target space at any given time and to change the portion displayed, if needed, in response to movement of the control space relative to the target space by the user, so as to display a portion of the target space that includes the overlapping portion of the control space, even if the control space is moved by the user to an area within the target space that lies outside the portion of the target space originally displayed by the visual user interface.

2. A visual user interface as in claim 1, wherein the device comprises a video camera, the target space comprises a target scene, and the control space comprises a control scene; and wherein the control scene comprises a scene currently being filmed.

3. A visual user interface as in claim 1, wherein the means for enabling a user to change the state of the control space is adapted to enable the user to change the size of the control space with respect to the target space.

4. A visual user interface as in claim 1, wherein the means for enabling a user to change the state of the control space is adapted to enable the user to change the shape of the control space with respect to the target space.

5. A visual user interface as in claim 1, wherein the means for enabling a user to change the state of the control space is adapted to enable the user to change the angular orientation of the control space with respect to the target space.

6. A visual user interface as in claim 1, wherein the means for enabling a user to change the state of the control space is adapted to enable the user to change the location of the control space with respect to the target space.

* * * * *